United States Patent Office 3,609,952
Patented Oct. 5, 1971

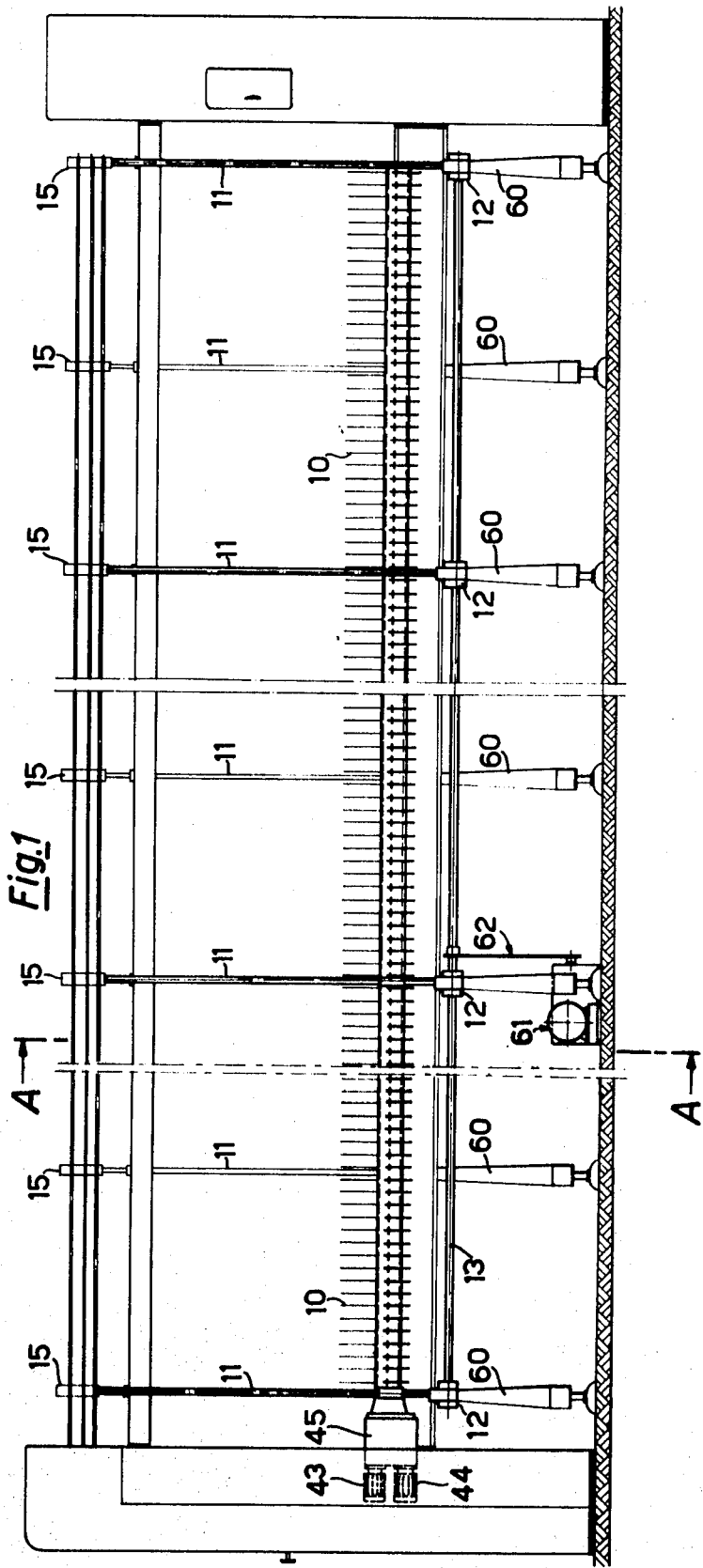

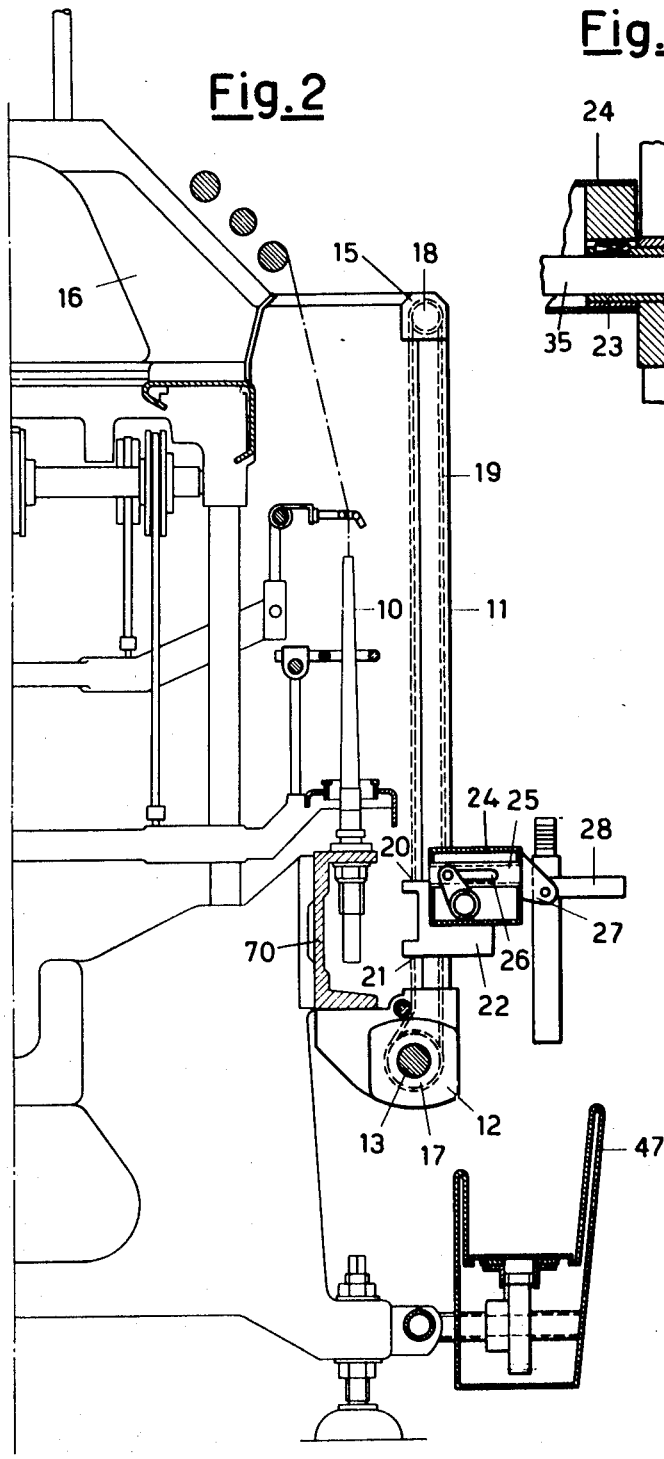

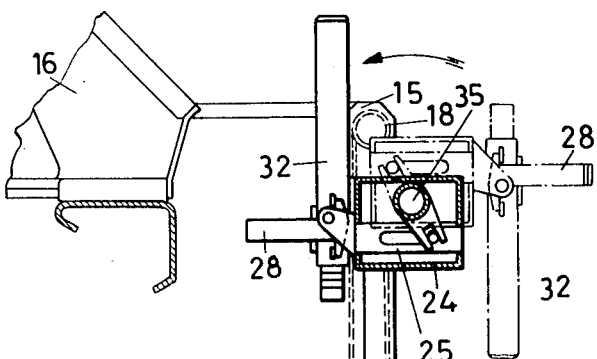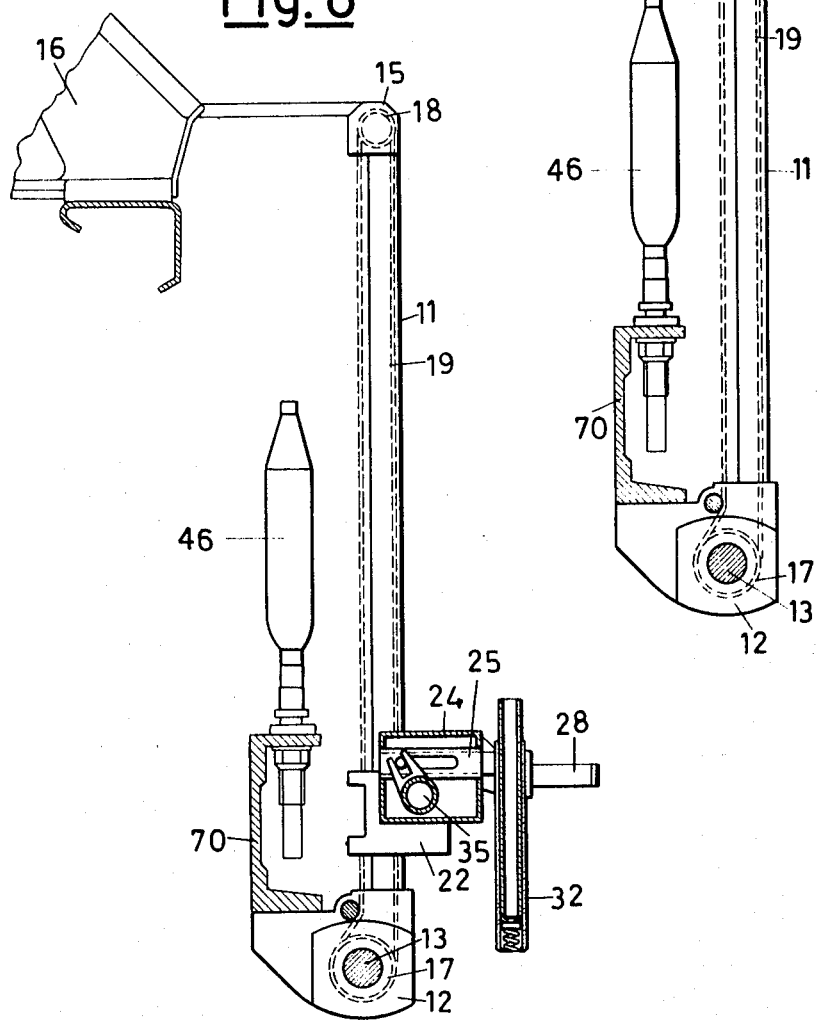

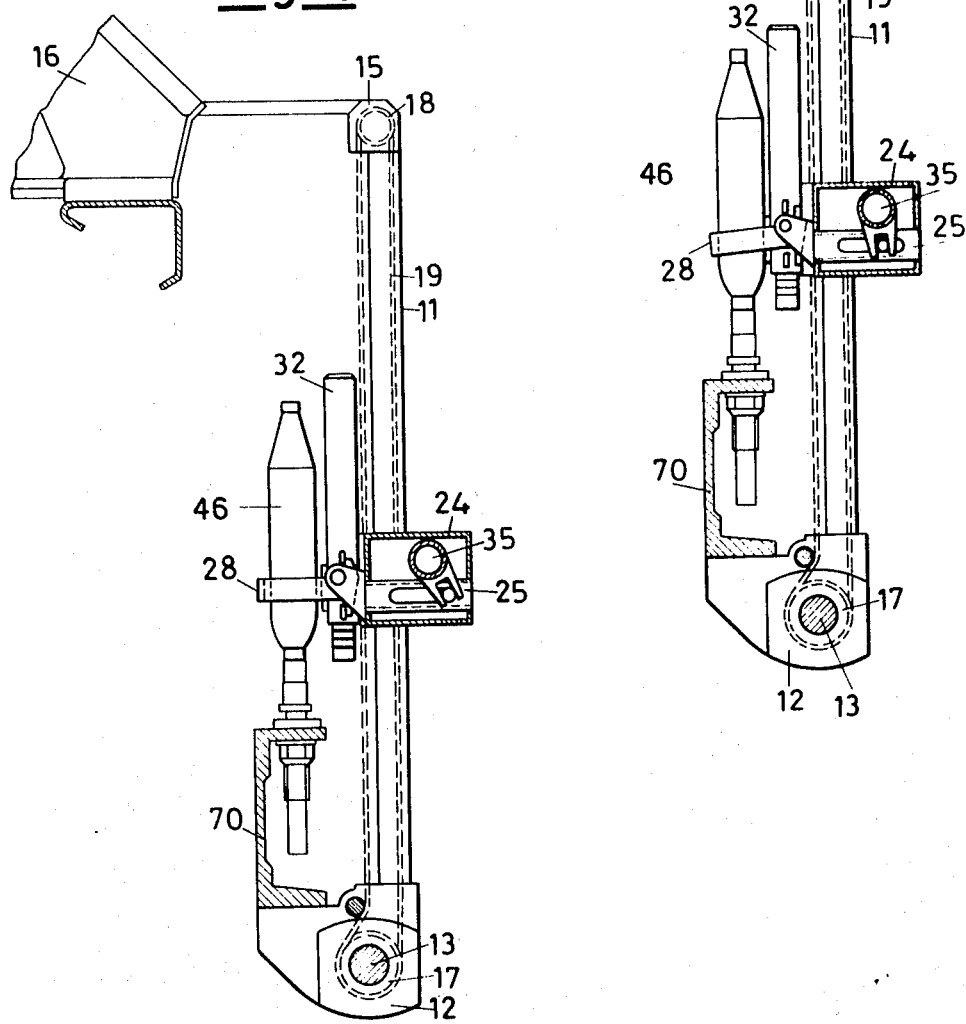

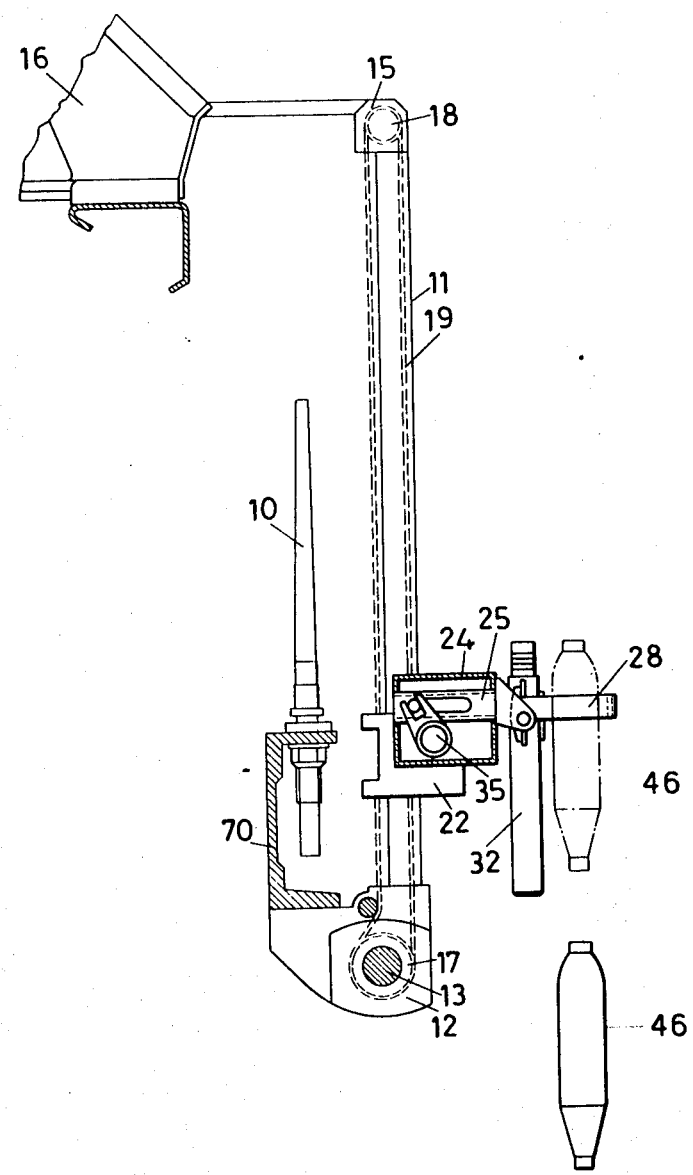

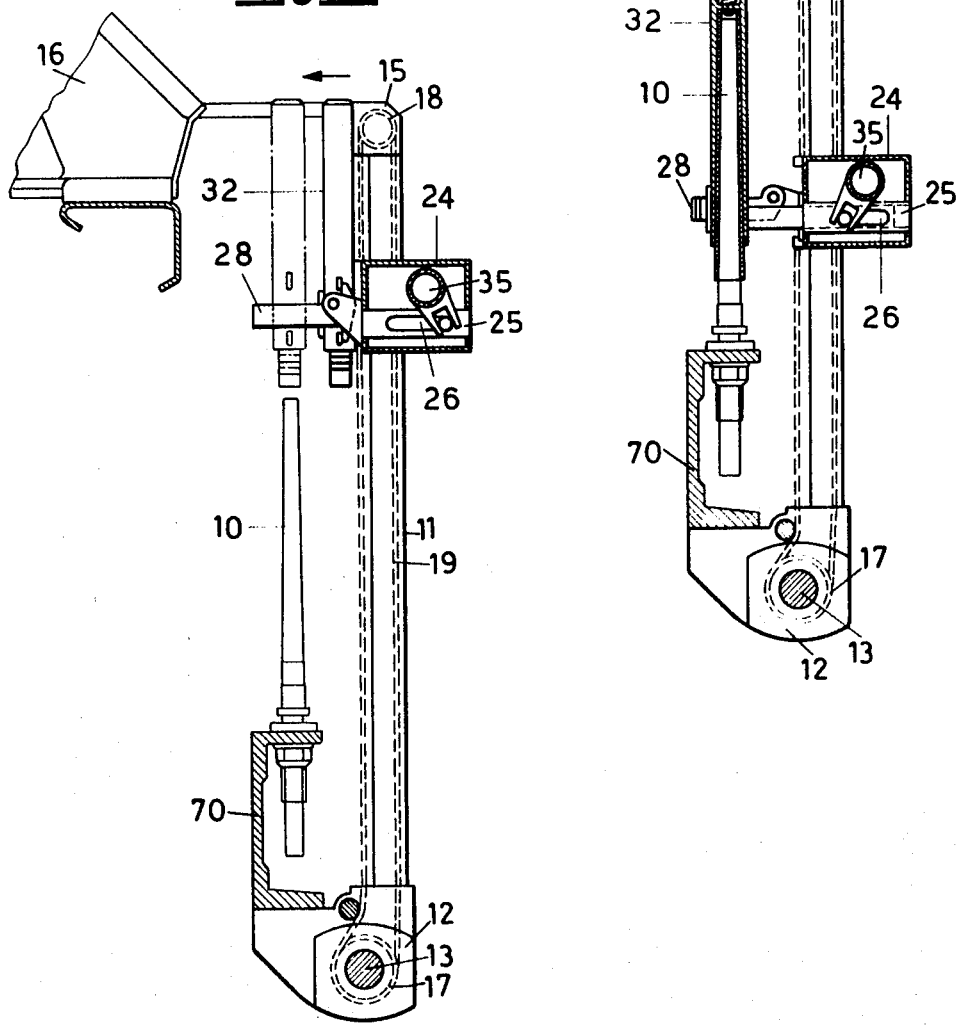

3,609,952
AUTOMATIC MECHANICAL DEVICE FOR DOFFING AND LOADING SPUN YARNS IN SPINNING FRAMES, DOUBLING FRAMES AND THE LIKE
Natale Chiari, Valerio Calabria, and Giuseppe Inverardi, Cologne Bresciano, Italy, assignors to Edera S.p.A. Officina Meccanica Tessile, Milan, Italy
Filed July 8, 1969, Ser. No. 839,893
Claims priority, application Italy, July 8, 1968, 18,706/68
Int. Cl. D01h 9/00
U.S. Cl. 57—52
12 Claims

ABSTRACT OF THE DISCLOSURE

A doffing and discharging device for the supporting members carrying yarn wound on bobbin in a spinning or doubling frame is disclosed, the characteristic feature being that each doffing and slipping member (to slip bobbins on spindles) comprises two portions, the first of which engages the periphery of the supporting member by grasping it, and the second portion of which engages a diametrically opposite portion of the supporting member aforesaid. Resilient gasket members are provided on the active surfaces so as to avoid any damage to the yarns wound on the bobbin. Means are also provided to facilitate the discharge of the full bobbins into a receptacle and to position the empty tubes on the spindles.

This invention relates to a device for the automatical doffing of supporting members (such as bobbins, tubes, cops and the like) loaded with yarn, from the spindles of ring spinning frames, doubling frames and the like and for loading the empty supporting members onto the spindles by using completely mechanical and synchronized movements.

It is known that the operations of doffing the yarn-loaded supporting members and of slipping the empty supporting members onto the spindles of said machines have been effected hitherto by hand, with waste of time and a considerable employment of labour, especially considering that in the up to date spinning machines a very high number of spindles is provided for, which in many instances amount to many hundreds.

In the most recent years several devices have been devised and embodied, having the purpose of solving such a problem, that is, to permit the simultaneous doffing of all (or nearly so) the yarn-loaded supporting members and the immediately subsequent loading of empty supporting members so as to have the machine, within a short delay, in readiness for the next operative cycle.

In this connection, the Italian patent specification No. 663,966 to Fritz von Schmoller can be cited, which disclosed and claimed a device for doffing the spinning bobbins from the ring spinning frames, the device comprising one or more doffing members which encompass and grip the yarn-loaded bobbin concerned, each doffing member being capable of being shifted vertically and swung through a certain angle under the control of motive means. In summation, each yarn-loaded bobbin is grasped and lifted by a corresponding member of its own, whereas the spindle acts as a vertical bobbin-guiding member. As the bobbin reaches the spindle end and disengages the spindle, the bobbin is simultaneously disengaged also from the doffing member and falls by gravity into a specially provided container. The doffing member is also integral with a device for loading an empty bobbin or tube, such member being capable of carrying out a controlled swinging movement about the doffing member so as to place the empty bobbin in position for the subsequent yarn-loading operation. However, the doffing of the yarn-loaded bobbin and the slipping of the empty bobbin require a few manual control operations; moreover, the yarn package can be damaged when the supporting member is disengaged from the doffing member aforesaid. More particularly, the most serious shortcoming of such a doffing device is that it imparts to the bobbin and to the spindle which bears it a considerable clamping action, accompanied by a corresponding bending moment and that the doffing member should take an accurately defined position relatively to the bobbin so as to effect doffing thereof.

Other devices are also known, which are based on the principle of engaging a bobbin by a bladder-like or other inflatable member, which, when inflated, is capable of pulling off the loaded bobbin from the spindle and of transferring it onto a temporary supporting member, to be specially provided, whereafter other empty bobbins, ready to use, are positioned onto the spindles with the same method. Devices of this kind, in addition to rendering the textile machines considerably more complex due to the addition of pneumatic pipings and the like, exhibit also a phase shift, generally as great as one half pitch (i.e. one half of the gap between the two adjoining spindles), between the doffing member and the insertion member, so that the movements which are necessary to perform the whole cycle are more complicated and difficult, as they require an extremely fine adjustment.

This invention provides an efficient and advantageous solution to the problem summarily outlined above, and more particularly, it provides an automatic and mechanical device which, by following an orderly sequence of steps, effects the withdrawal of the yarn-loaded supporting members by the agency of a mechanical member comprising a first portion which engages a peripheral portion of the yarn-loaded supporting member by gripping it around, and a second portion which engages, independently of the first portion, a diametrically opposite part of the supporting member, the second portion being shiftable between an engaged and a disengaged position of the supporting member, the second portion causing the engagement of the first portion, both the first and second portions disengaging the supporting member from the spindle and transferring it to the discharge position where, in addition, said second portion supports and positions an empty supporting member onto a spindle.

More detailedly, the device according to the present invention is characterized in that said first portion engaging the yarn-loaded supporting member to be unloaded and said second portion which engages the supporting member loaded with yarn and is adapted to slip an empty supporting member onto a spindle are aligned perpendicularly to the longitudinal axis of the spinning or doubling frame, and that said second portion is brought to its operative position by a control member whose movements are correctly determined by synchronized motive means. Summing up, it can be said that said first and second portions, as they are engaged with a supporting member to be unloaded, are two surfaces for engaging the yarn-loaded bobbin, which are converging towards the spindle axis and ensure the doffing of the bobbin from the spindle.

Furthermore, this invention provides, in a preferred embodiment, a supporting mechanism which can be disengaged from the yarn, loaded supporting member and which comprises cantilever rotatably pivoted to said second portion aforementioned and resiliently urged towards the position where it supports an end of a yarn-loaded supporting member, said lever having an arm which protrudes from the diametrically opposite end, said arm being engageable by a fixed cam located on a carriage which is movable longitudinally along the spindle frame so as to rotate said arm and thus the lever towards the position where the yarn-loaded supporting member is disengaged and is no longer supported by the lever.

It is obvious that, as will be more clearly set out as the ensuing disclosure proceeds, once the stage of winding the yarn on the supporting member has been completed and so also the movement thereof towards the discharge position, it is possible to discharge all the supporting members of a single carriage movable along the spindle frame.

The main advantage of the inventive device lies in the perfect and complete automatic operation of all the doffing movements of the yarn-loaded supporting member and slipping of the empty supporting member.

Another important advantage resides in the fact that the yarn-loaded supporting member is engaged so as to prevent any damage to the yarn and is accompanied to the position of discharge into the collector without any possibility of interference with other portions of the spinning frame.

Still another advantage is the one of perfectly slipping the empty supporting member on the spindle, by ensuring, with the aid of resilient means, that the supporting member is not held in said second portion.

Other objects and advantages will become more clearly apparent from the ensuing description of a preferred embodiment, given by way of example only and without limitation; reference being had to the accompanying drawings, wherein:

FIG. 1 is a diagrammatical front view of a spinning frame equipped with the device according to the present invention.

FIG. 2 is a diagrammatical side view, in section, of the device relatively to a spindle.

FIG. 3 is a cross-sectional view of a mounting detail.

FIG. 6 is a view, similar to FIG. 2, of the device according to the present invention, in the at rest position.

FIGS. 7, 8, 9, 10, 11, 12 and 13 are views similar to FIG. 6 and show the device of the present invention in different positions and operational stages.

Figure 1A:
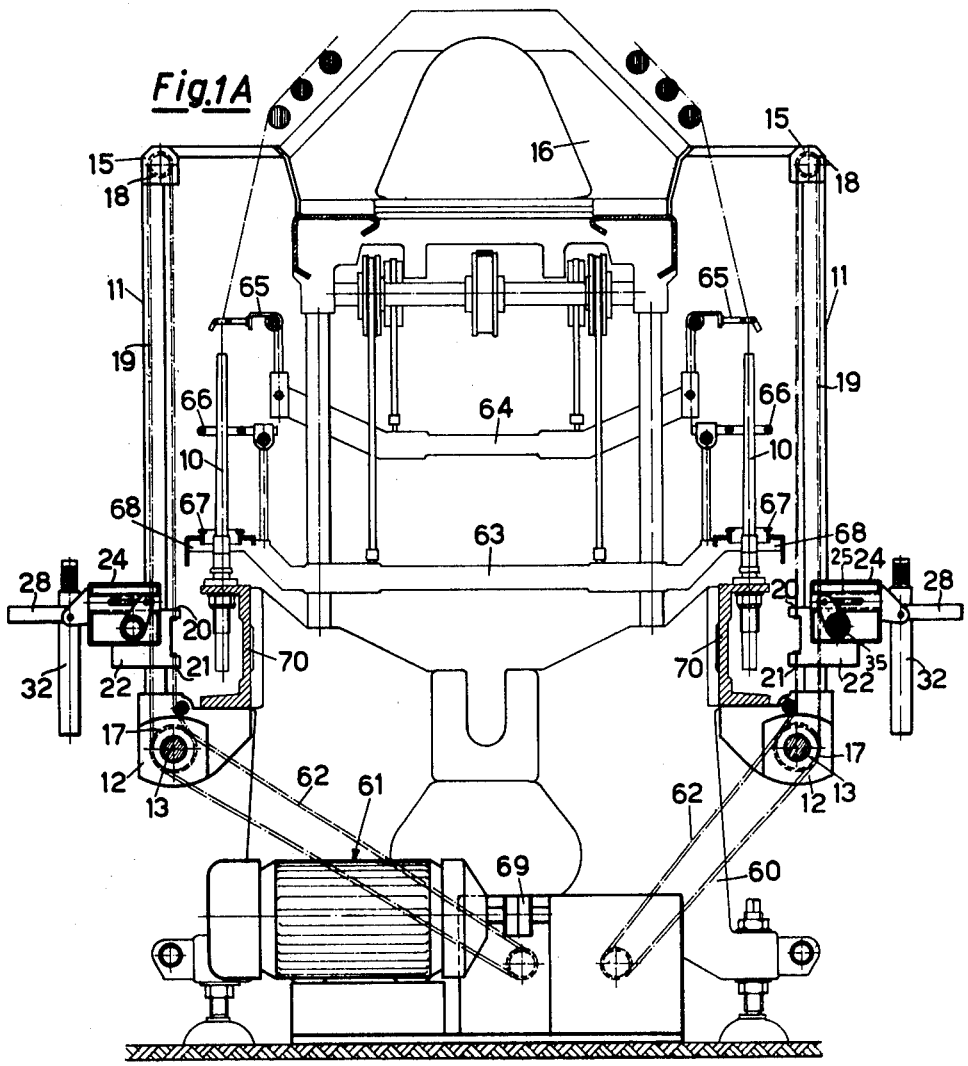
FIG. 1A is a diagrammatical cross-sectional view of the spinning frame of FIG. 1, taken along the line A—A.

Having initially reference to FIGS. 1 to 5, a spinning frame is partially shown, which comprises spindles 10, mounted for rotation in a conventional manner on suitable supporting members. It is important to observe that the spindles 10 are mounted on two rows which are parallel and symmetrical with respect to the intermediate longitudinal plane of the spinning frame and that all the component parts to be described and shown herein with reference to a spindle row are identically duplicated in the other row. To the intermediate legs 60 are affixed supporting members 12 on which a control shaft 13 is mounted for rotation, the shaft extending along the entire length of the spinning frame. The shaft 13 is driven to rotation by a prime mover 61 through a coupling 69 and a drive transfer mechanism 62, known per se. More particularly, the motor 61 is of the self-braking type.

Each supporting member 12 carries uprights 11 having at their tops a transversal carrier 15, which, in turn, is affixed by means of an extension to the so-called roller-support 16, so that each upright is rigidly affixed.

As can be seen more particularly in FIG. 1A, the spinning frame comprises the usual component parts such as the carriage lifter 63, the thread guide control 64, the thread guide 65, the antiballooning device 66, the ring 67, the ring rail 68 and the spindle rail 70.

In the lower supports 12 and in the upper ones, 15, are seated two pinions 17 and 18 to drive the chain 19. The two ends, 20 and 21, of the chain are affixed to a guide-plate 22, which is slidable in a vertical direction on the uprights 11 and has a central sleeve 23 on which they are mounted so as to be enabled to rotate, through 180°, the sections of a rectangular channel 24.

To the channel 24 is rigidly and transversely affixed a through-tube 25 having a slot 26. At one end of the tube 25 are formed two pivoting trunnions 27 having bores adapted to receive pivotal pins of a ring 28 having a cross-sectional shape which is preferably octagonal, whose outermost side has internally along the entire axial height of the ring, a resilient gripping member 29, preferably of rubber. The innermost ends 30 of the ring 28 are shaped as shown in FIG. 4 to a purpose to be explained later.

Internally of the through-tube 25 is slidably housed a second through-tube 31 which, at the end which is external with respect to the channel 24 carries, perpendicularly, a tubular housing 32 for the empty tube. To cause the sliding of the tube 31 a pin 33 is provided, which is adapted to slide in the slot 26 and is actuated by a forked arm 34 pivoted for rotation to a shaft 35, the latter being rotated within the sleeve 23. The housing 32 has two appropriate projections 36 and 37, uppermost and lowermost, respectively, intended to serve as temporary abutments for the ends 30 of the ring 28, impeding the rotation thereof by gravity about the pivoting pins in the trunnions 27.

It is important, at this stage, to notice that the shaft 35 runs along the entire length of the channel 24, in the interior thereof, supported by the guiding plate 22 and, by the agency of the arm 34, controls the grip and the release of the yarn-loaded supporting member as well as the displacement of the tubular casing 32 so as to allow the empty supporting member to be slipped onto the spindle. In addition, another resilient gripping means 38 is provided on the tubular casing 32, and precisely on a portion of the outer surface thereof, for a purpose which will be explained in the following.

Figure 4:
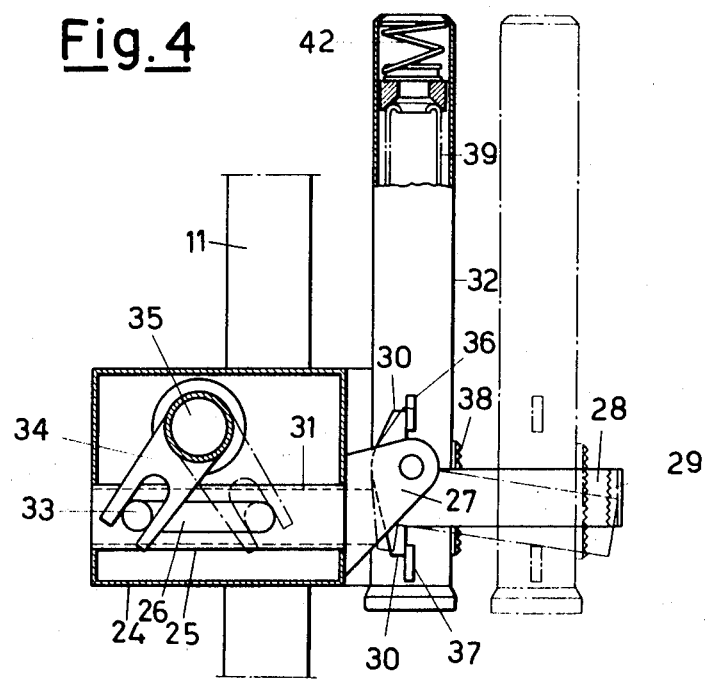
FIG. 4 is a detailed view of the doffing and slipping member.
Figure 5:
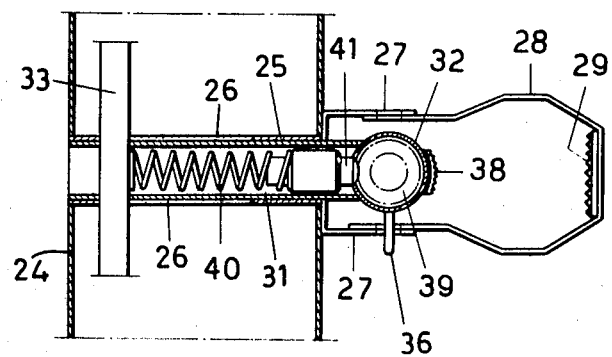
FIG. 5 is a plan view from top of FIG. 4.

Considering now particularly FIGS. 4 and 5, it is clearly shown that the empty supporting member 39 is held in position inside the tubular casing 32 by the horizontal spring 40 which urges a pin 41 to engage, under a preselected and not too high pressure, the outer surface of the empty supporting member 39, so as to ensure that the latter may not fall by gravity from the casing 32. In addition, at the closed end of the casing 32 a compression spring 42 is provided which is normally in its released condition.

It should be noticed, lastly, that FIG. 1 shows two electric motors, 43 and 44, respectively, which, through an appropriate gearbox 45 of conventional make, control the rotation of the shaft 35, or, as an alternative, of the channel 24, the latter rotation extending through 180° only.

Considering now the FIGS. from 6 to 13 inclusive, the different stages of a doffing operation of filled bobbin 46 from a spindle 10 and of the slipping of an empty bobbin into the spindle 39 are shown.

More particularly, FIG. 6 shows the doffing mechanism in its at rest position. When the yarn filled bobbin 46 has reached the desired yarn load, the shaft 13 is actuated, which rotates the pinion 17. Consequently, the pinion drives to rotation the chain 19, and the supporting plate 22 along with the channel 24, is shifted upward until reaching the position indicated with dash and dot lines in FIG. 7.

At this stage the shaft 13 is stopped, while the motor 43 is energized to rotate the channel 24 through 180° until reaching the position shown in solid line in FIG. 7, the return stroke being started since the shaft 13 has been driven again, after the 180-degree rotation, in a direction contrary to the previous one.

The downward stroke of the plate 22 is continued until the ring 28, as shown in FIG. 8, surrounds an intermediate zone of the filled bobbin.

It can be clearly seen in FIG. 8 that the bobbin 46 is still disengaged from the ring 28 as the lever arm 34 is at the end of the slot 26 in the disengaged position and the projections 36 and 37 maintain the corresponding ends of the ring 28 in a horizontal position.

At this stage, the motor 44 is energized to rotate the shaft 35; the latter, in turn, brings the lever arm 34 to the position shown in FIG. 9. Consequently, the ends 30 of the ring 28 are disengaged from the projections 36 and 37 and these, in turn, are shifted outwardly along with the tubular casing.

Thus, the ring 28 is depressed, due to its own weight, about the trunnions 27 and engages the resilient portion 29 with the outer surface of the bobbin 46, whose opposite face is engaged by the resilient portion 38 of the tubular casing 32, the latter having been brought forward by the displacement of the pin 33 by the agency of the lever arm 34.

It is thus obvious that the bobbin 46 is firmly held, without damage for the yarn wound thereon.

At this stage, the motor which drives the shaft 13 is energized again so as to restore in its uppermost position the plate 22 while simultaneously disengaging the bobbin 46 from the spindle 10.

Figure 10:
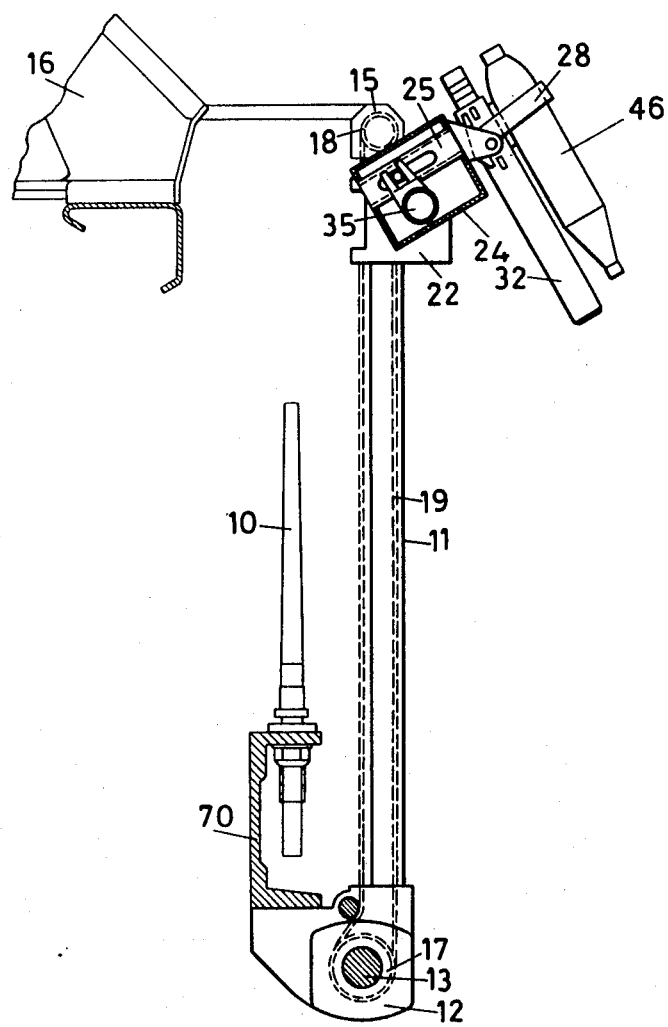

The plate 22 reaches the upper end on the upright 11 and thus a rotation of the channel 24 through 180° takes place again (FIG. 10) so that the bobbin is accompanied toward the lowermost portion as shown in dash and dotted lines in FIG. 11. Then the shaft 35 is rotated so as to bring the pin 33 to the end of the slot 26 again and consequently the resilient portion 38 disengages the bobbin 46 while the ring 28 is brought to its horizontal position again since the projections 36, 37 and the ends 30 of the ring 28 have become engaged again. The bobbin 46 is thus set free and falls by gravity into the receptacle 47.

The sequence reported above is repeated to restore the engagement of the empty supporting member 39 with the spindle 10, the only exception being that, as shown in FIG. 12, as the channel 24 has been rotated through 180°, the shaft 35 is driven so as to bring the lever arm 34 and the pin 33 to the opposite end of the slot 26, so that the tubular casing is shifted outwardly to such a position as to match the spindle 10. Continuing the downward stroke of the plate 22, the empty bobbin 39 is slipped into the spindle 10 and is mounted thereon. It is to be noticed that in this downward movement, the spring 42 is compressed so that the subsequent upward stroke of the plate 22 ensures the disengagement of the empty bobbin from the tubular casing 32.

Figure 14:
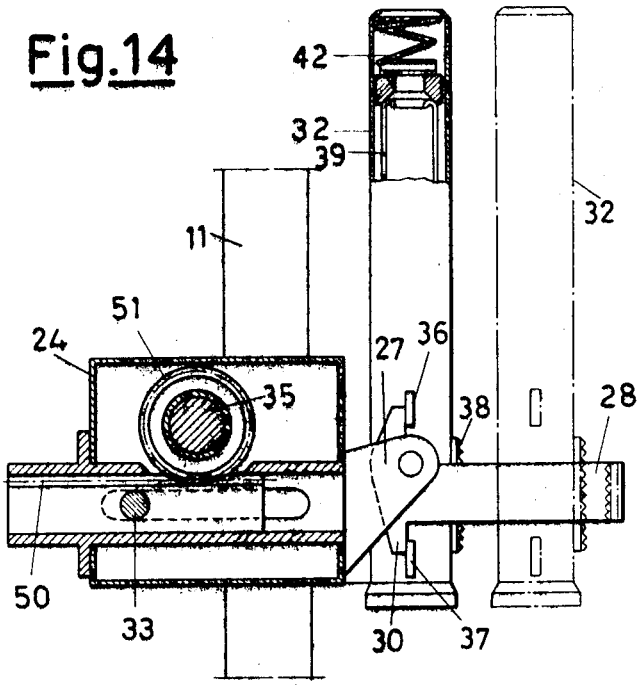
FIGS. 14 and 15 are two views similar to FIGS. 4 and 5 which show a preferred modification of the invention.
Figure 15:
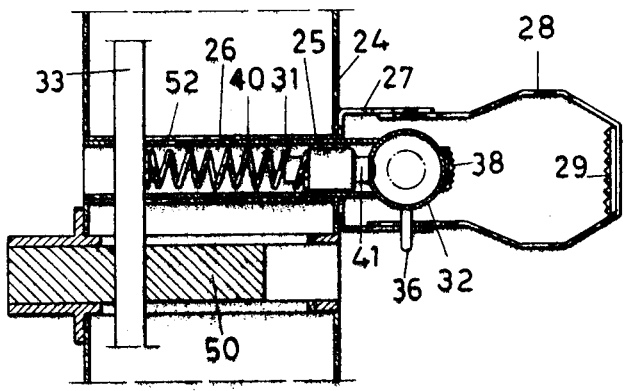

Considering now the embodiment of FIGS. 14 and 15, it is seen that the modifications over FIGS. 4 and 5 are the following:

(a) To shift the pin 33 in the interior of the slot 26, the lever arm 34 is replaced by a rack 50 which is a part of a tubular member perpendicular to the pin 33 and rigidly engaged therewith, the rack being actuable by a helically toothed wheel 51 integral with the shaft 35. It is obvious that by so doing, the pulses imparted to the shaft 35 are no longer gradual and require a smaller power for the energization of the shaft 35.

(b) The pin 33 is movable in a second slot 52 formed in the through-tube 31 and is directly urged by the spring 40. Thus, possible variations in the size of the yarn-loaded bobbin are absorbed by the spring and the yarn does not undergo a rigid thrust. It is obvious that in this case the spring 40 is preloaded.

It is thus apparent that, by providing suitable conventional devices for programming and attuning the movements of the several motive members, and more particularly of the shaft 13, the shaft 35 and the member entrusted with the 180-degree rotation of the channel, the whole operation of doffing the yarn-loaded bobbins and inserting the empty bobbins onto the spindles can be completely automatized.

Figure 16:
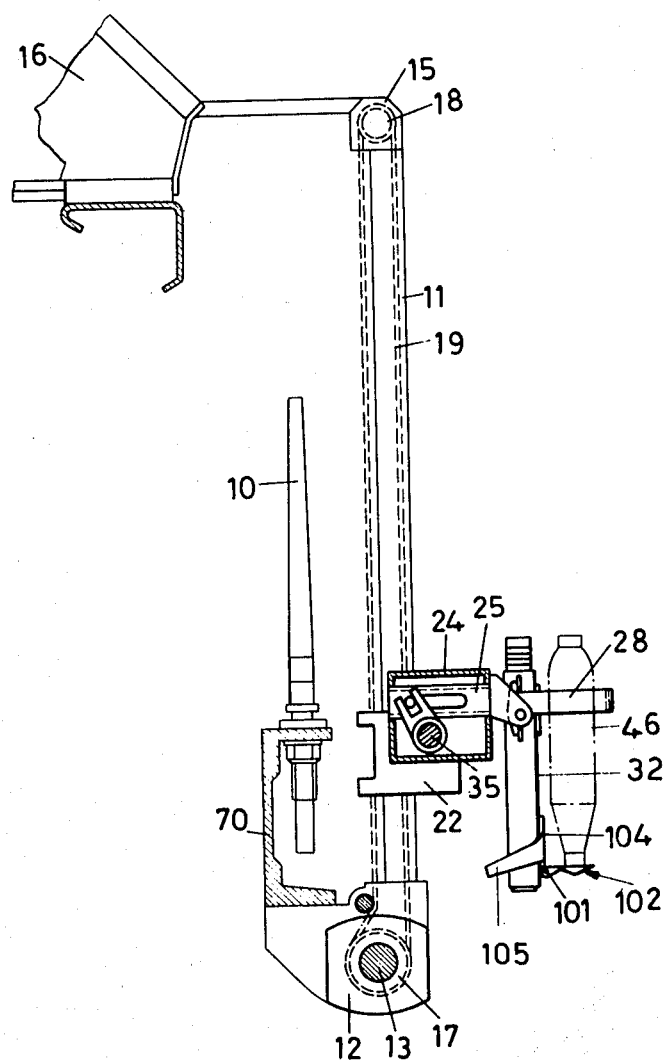
FIG. 16 is a view similar to FIG. 2 showing the additional supporting mechanism for the yarn-loaded supporting member.
Figure 17:
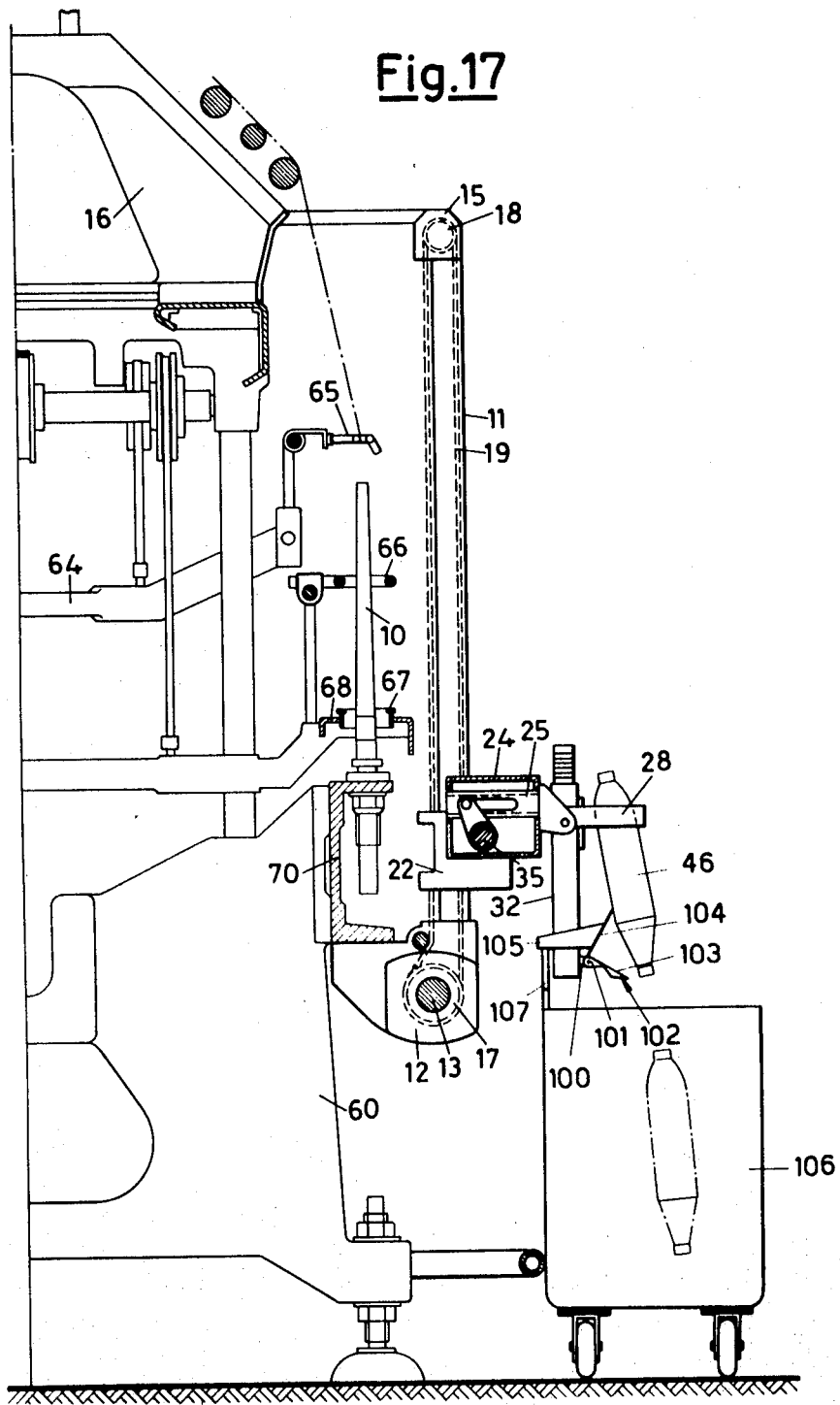
FIG. 17 is a view similar to FIG. 16, showing the discharge phase of the yarn-loaded supporting member from the spinning frame.
Figure 18:
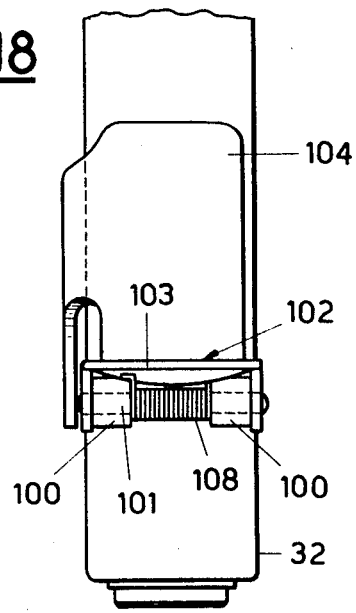
FIGS. 18 and 19 are close up, on an enlarged scale, of the additional supporting mechanism for the yarn-loaded supporting member.
Figure 19:
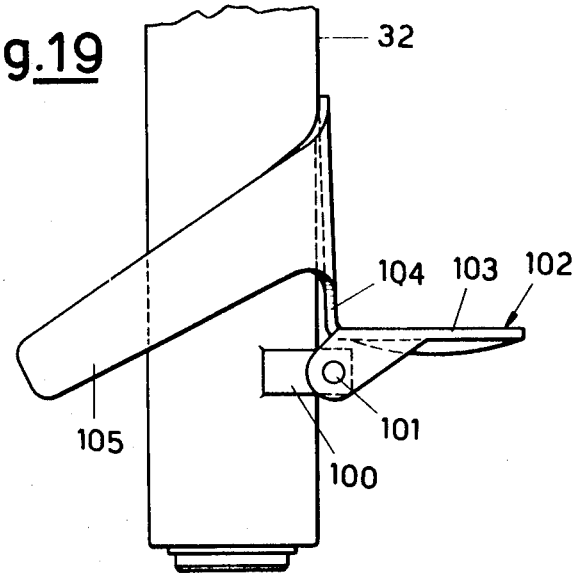

Referring now to FIGS. 16 to 19 inclusive, a further embodiment is shown in which, to the tubular casing 32 a stirrup 100 is affixed, which has a pin 101. On the latter is rotatably mounted a bell-crank lever 102, having an arm 103 intended to engage (as shown in FIG. 16) the lower end of the supporting member 46 filled with yarn by resting against said end, as the supporting member has reached the discharge position shown in FIG. 11. To the other end of the bell-crank lever 102 is rigidly associated an arm 105 which projects, relatively to the casing 32, at the side which is diametrically opposite to the side 103 of the lever 102; a spring 108 urges the lever 102 towards the position of FIG. 16.

To collect the supporting members 46 loaded with yarn once the winding operation has been completed, a carriage and container 106 is provided which is movable on wheels along the spindle frame. One side of the carriage has a fixed cam 107 which protrudes upwardly and is adapted to engage sequentially, as it travels along the spindle frame, the arms 105 of each tubular casing 32, so that each lever 102 is sequentially rotated about the pivot 101 and the yarn-loaded supporting members thus freely fall in sequence into the container of the carriage 106. After the passage of the cam 107, the lever 102 is restored to the position of FIG. 16 by the agency of the spring 108.

It is obvious that a preferred embodiment has been described, but numerous mechanically equivalent solutions can be envisaged within the scope of the invention.

What is claimed is:

1. A mechanical automatic device for doffing supporting members which carry wound yarns and for slipping empty supporting members onto spindles of spinning frames, doubling frames and the like, comprising; a plurality of mechanical doffing and slipping devices for conveying said suporting members from their initial positions at a predetermined motion to discharge positions, each of said doffing and slipping devices comprising, relatively, a first portion for gripping a peripheral portion of a yarn-loaded supporting member, a second portion for gripping independently of the first portion, a diametrically opposite peripheral portion of said supporting member, means for moving said second portion relative to said first portion between a gripping and a disengaged position of said yarn-loaded supporting member, movement of said second portion into said gripping position effecting corresponding gripping engagement between said yarn-loaded supporting member and said first portion, means for transferring said first and second portion for disengaging said yarn-loaded supporting member from the spindle and transferring it to the discharge position, said second portion comprising means for supporting an empty supporting member, and means for positioning said empty supporting member on said spindle.

2. A device as claimed in claim 1, comprising a carrier extending along said spinning frame, said doffing and slipping devices being supported on said carrier, first motive means for importing vertical motion to said carrier, second motive means for imparting rotation to said carrier through an angular displacement of 180° about its longitudinal axis, said first portion comprising an open-ring member having its open end pivotally connected to said carrier so as to be pivotable about a horizontal axis, said means on said second portion for supporting an empty supporting member being mounted on said carrier in axial alignment with said ring member transversely of said carrier, a rotatable shaft extending through said carrier, third motive means for imparting rotation to said shaft, and linkage means interconnecting said shaft and said second portion, said second portion being transversely movable relative to said carrier in response to rotation of said shaft.

3. A device as claimed in claim 1, wherein said doffing device comprises a channel-shaped box extending along said frame, vertically movable endless conveyor chains positioned at intervals along said frame, plate means for supporting said box fastened to said chains, drive pinions and driven pinions positioned at opposite vertical ends of said chains and having teeth interengaging therewith for imparting movement to said chains, means for rotating said channel-shaped box through 180° with respect to said supporting plate means, said device carrying said doffing members during said rotation.

4. A device as claimed in claim 3, wherein said endless chains move said supporting plate means in an essentially rectilinear motion.

5. A device as claimed in claim 2, wherein said first portion for gripping said yarn-loaded supporting member including an axially extending internal surface coated with a resilient material adapted to contact said supporting member, said open-ring member comprising a U-shaped member having its leg portions pivotally connected to said carrier, each of said leg portions having extensions, a pair of projections formed on the outer surface of the carrier proximate to said empty supporting member, said projections engaging said extensions on said leg portions so as to maintain the U-shaped member in a horizontal position when said member is disengaged from the yarn-loaded supporting member.

6. A device as claimed in claim 3, wherein said means for supporting said empty supporting member comprises a vertical casing housing the empty supporting member, a hollow bar rigidly fastened to said casing, said channel-like box including a horizontally extending seating cavity, said bar being adapted to slide within said cavity, a slot formed in the side of said box, a pin on said bar projecting through said slot, a lever arm engaging the end of said pin, a rotatable shaft extending along the entire length of said channel-like box, said lever arm being pivotably actuated in response to rotation of said shaft, and a motor for driving said shaft.

7. A device as claimed in claim 6, wherein the portion of said vertical casing comprising said second portion includes a coating of a resilient material.

8. A device as claimed in claim 7, wherein said resilient coating consists of rubber.

9. A device as claimed in claim 6, wherein said means for supporting said empty supporting member comprises a first horizontal spring housed within said horizontally slidable bar, said spring having its outer end in free contact with an empty supporting member contained in said casing, and a second vertical spring housed in said casing and seated between the top of the empty supporting member and the bottom of said casing.

10. A device as claimed in claim 9, wherein said first mentioned spring has its other end in engagement with said pin provided in said bar.

11. A device as claimed in claim 3, wherein said means for supporting said empty supporting member comprises a vertical casing housing the empty supporting member, a hollow bar rigidly fastened to said casing, said channel-like box including a horizontally extending seating cavity, said bar being adapted to slide within said cavity, a slot formed in the side of said box, a pin on said bar projecting through said slot, a tubular member extending transversely through said box and being rigidly engaged by said pin, a rack formed integrally with said tubular member, a rotatable shaft extending along the entire length of said channel-like box, a toothed wheel rigidly mounted on said shaft and engaging said rack, and a motor for driving said shaft so as to correspondingly move said tubular member transversely relative to said box.

12. A device as claimed in claim 6, including further supporting mechanism for disengaging yarn-loaded supporting members from said device, comprising a cantilevered lever pivotally mounted on said casing, said lever being resiliently urged towards an at-rest position so as to normally support an end of a yarn-loaded supporting member resting thereon, and an arm rigidly connected to said lever, said arm projecting from the diametrically opposite portion of said casing.

References Cited

UNITED STATES PATENTS

| | | | |
|---|---|---|---|
| 1,810,754 | 6/1931 | Buddecke | 57—52 |
| 2,612,744 | 10/1952 | Christianson | 57—52 |
| 3,010,272 | 11/1961 | Mas | 57—52 |
| 3,117,408 | 1/1964 | Fisher | 57—52 |
| 3,350,868 | 11/1967 | Winter | 57—52 |
| 3,370,411 | 2/1968 | Schulz et al. | 57—52 |
| 3,398,519 | 8/1968 | Haussmann | 57—52 |

FOREIGN PATENTS

| | | | |
|---|---|---|---|
| 1,083,191 | 9/1967 | Great Britain | 57—52 |

STANLEY N. GILREATH, Primary Examiner

W. H. SCHROEDER, Assistant Examiner